May 10, 1932. A. L. LINDERMAN ET AL 1,857,388
BOLT
Filed July 7, 1931
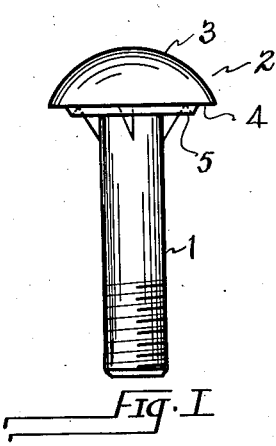
Fig. I
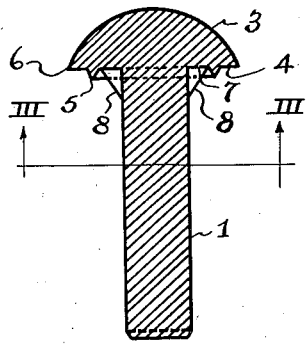
Fig. II
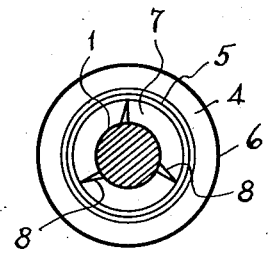
Fig. III
INVENTOR
Andrew Lyle Linderman
Thomas J. Maines
by Christy Christy and Wharton
their attorneys Patented May 10, 1932

1,857,388

UNITED STATES PATENT OFFICE

ANDREW LYLE LINDERMAN AND THOMAS J. MAINES, OF PITTSBURGH, PENNSYLVANIA

BOLT

Application filed July 7, 1931. Serial No. 549,168.

Our invention relates to a sheathing bolt, that is, to a bolt which is particularly adapted for securing members of wood to other members of wood or of metal. We have particularly in mind the provision of a bolt for securing wooden roofs and sides, etc., to the metal (or wooden) frames of freight-cars. It is a matter of common knowledge that bolts for such purpose must be provided with means to prevent rotation of the bolt when it is in place within the members to be mutually secured and a nut is being screwed home on its threaded shank. Hitherto the practice has been to provide bolts having their shanks, in the region of the bolt heads, formed square in cross section, or, to provide bolts having laterally extending fins formed on their shanks. In either of such structures, manifestly, when the bolt is forced home in a wooden member, rotation of the bolt is effectively prevented. However, a disadvantage attends the use of these or similar bolt structures. That is to say, the portions or elements of the bolt structures which are adapted to prevent rotation in the manner said have been found to disrupt and to spread the fibres of the wood in which they are installed, and to leave the wood surrounding the bolts accessible to moisture. Moisture upon lodging beneath the head and around the shank of a bolt causes a deterioration and a rotting of the wood.

It is the object of our invention to provide a sheathing bolt structure which, upon installation in wood or other fibrous material, will be secured against turning and will be effective in preventing moisture from entering the wood adjacent the shank of the bolt.

Another object of the invention is to provide a bolt structure which is adapted upon installation to compress the material, in which it is located, tightly against the shank of the bolt.

Still another object of our invention is to provide a bolt—a bolt affording the above-mentioned advantages—that can be economically manufactured, either by hot or cold process, in the usual bolt-forming machines.

In the accompanying drawings a bolt embodying the invention is illustrated. Fig. I is a view of the bolt in side elevation; Fig. II is a sectional view, taken on a vertical plane medially of the shank of the bolt; and Fig. III is a sectional view, taken on the plane III—III of Fig. II.

Our bolt comprises a shank 1, having formed (conveniently by upsetting) on its one end a head 2. In this case we show the outer face 3 of the head to be spherical in form; the nether face 4 of the head advantageously is flat, extending in a plane perpendicular to the axis of shank 1. On the nether face 4 of the bolt we provide an annular ridge 5; the ridge in this case is triangular in cross section (cf. Fig. II) and advantageously it is so. Conveniently the annular ridge is concentric with the shank of the bolt, and it is important to note that the annular ridge is located at an interval from the shank 1 and at an interval from the peripheral edge 6 of the head 2. Accordingly, the nether face 4 includes an annular region 7, lying between the face of the shank and the ridge 5.

Extending from the shank 1 is a pluarlity of fins 8. The edges of these fins are inclined with respect to the axis of the bolt, and at their tops they merge with the head of the bolt (that is with face 7), as shown in Fig. II. All portions of the fins 8 lie radially within the ridge 5, and, advantageously, at their tops the fins are of such radial extent that they terminate in, or adjacent to, the ridge 5.

In service, the fins enter between the fibres of the wood in which the bolt is installed, and so prevent the bolt from turning while a nut (not shown) is being screwed on the threaded end of shank 1, to draw the bolt home and mutually to secure the members through which the bolt extends. While one or more fins 8 may be provided on the shank 1, and will serve satisfactorily to the end in view, we have found that three fins 8, arranged in the manner indicated in Fig. III, are particularly desirable. This is for the reason that no two fins are disposed diametrically opposite on the shank of the bolt, and, accordingly, the tendency of the fins to split the wood (in which they are embedded when the bolt is installed) is minimized. That is to say, our multiple fin arrangement affords the desired resistance against turning, without the usual tendency to split the wood along its grain.

When, by means of the nut, the bolt is drawn into position where the members to be joined are firmly secured, the ridge 5 is pressed into the material in which the fins 8 have become lodged. The ridge 5 distorts and compresses the fibres of the material, but desirably the ridge does not sever or disrupt the fibres. Accordingly, when the head 2 has been drawn snugly against the material in which the bolt is installed, the ridge 5 is embedded in the material, and so, effective provision is made against the entrance of moisture to the material immediately surrounding the shank 1. That is to say, moisture is prevented from entering the wood adjacent the shank 1, and to the extent that the turning-preventing fins 8 open the wood, the openings are protected by the annular ridge 5 lying outwardly of the fins.

It is also noteworthy of our structure that the ridge 5, because of its triangular, cross-sectional shape, effects a shifting of the wood into tight contact with the shank of the bolt. That is, as the bolt is being drawn home, the ridge 5 confines in the space 7 beneath the head 2 an annular region of wood, and, when the bolt is drawn to its final position of installation, whereby the nether face 4 of the bolt-head lies against the face of the wood, the ridge 5 will have compressed the wood in the above-mentioned annular region tightly against the upper end of shank 1. As a result, the rigidity of the installation, as well as its moisture-excluding properties, is greatly improved.

We claim as our invention:

1. A sheathing bolt comprising a shank having a head upset on its one end, three fins equi-spaced circumferentially of and projecting laterally from said shank, and a ridge provided on the nether face of said head and encompassing said shank, which ridge is of such cross sectional shape and projects such distance from the nether face of said head that, upon installation in wood and in equivalent material, the wood is pressed laterally and tightly against said shank.

2. A sheathing bolt comprising a shank having a head formed at its one end, the nether face of said head being provided with an annular ridge between the peripheral edge of said head and the surface of said shank, a plurality of fins projecting laterally from said shank and extending from the shank angularly upward and terminating in the nether face of said head immediately within said ridge.

A. LYLE LINDERMAN.
THOMAS J. MAINES.